United States Patent [19]

Shu et al.

[11] Patent Number: 4,950,698

[45] Date of Patent: Aug. 21, 1990

[54] COMPOSITION FOR SELECTIVE PLACEMENT OF POLYMER GELS FOR PROFILE CONTROL IN THERMAL OIL RECOVERY

[75] Inventors: Paul Shu, West Windsor, N.J.; Winston R. Shu, Dallas, Tex.

[73] Assignee: Mobil Oil Corporation, New York, N.Y.

[21] Appl. No.: 292,799

[22] Filed: Jan. 3, 1989

[51] Int. Cl.$^5$ ............................................. C09K 7/00
[52] U.S. Cl. .................................. 523/130; 524/108; 524/323; 524/346; 524/557; 524/803; 525/58; 525/142
[58] Field of Search ............... 524/803, 108, 323, 346, 524/557; 525/58, 142; 523/130

[56] References Cited

U.S. PATENT DOCUMENTS

| | | | |
|---|---|---|---|
| 3,557,562 | 1/1971 | McLaughlin, Jr. et al. | 61/41 |
| 3,918,521 | 11/1975 | Snavely, Jr. et al. | 166/272 |
| 4,157,322 | 6/1979 | Colegrove | 260/15 |
| 4,366,303 | 12/1982 | Kopf | 524/459 |
| 4,440,228 | 4/1984 | Swanson | 166/274 |
| 4,479,894 | 10/1984 | Chen et al. | 252/8.55 D |
| 4,489,783 | 12/1984 | Shu | 166/272 |
| 4,513,821 | 4/1985 | Shu | 166/273 |
| 4,565,249 | 1/1986 | Pebdani et al. | 166/303 |
| 4,640,357 | 2/1987 | Jones | 166/273 |
| 4,658,898 | 4/1987 | Paul et al. | 166/270 |
| 4,716,966 | 1/1988 | Shu | 166/295 |
| 4,785,028 | 11/1988 | Hoskin et al. | 523/130 |
| 4,822,842 | 4/1989 | Mumallah et al. | 524/346 |

FOREIGN PATENT DOCUMENTS 0177324  4/1986  European Pat. Off. ............ 523/130

Primary Examiner—Joseph L. Schofer
Assistant Examiner—Mark D. Sweet
Attorney, Agent, or Firm—Alexander J. McKillop; Charles J. Speciale; Charles A. Malone

[57] ABSTRACT

A composition for closing pores in a formation following a steam-flooding enhanced oil recovery process. The composition comprises an aqueous temperature activated gellable mixture. This mixture is comprised of water, water dispersible polymers, phenolic compounds, and aldehyde producing compounds. Polymers which can be utilized herein include polyvinyl alcohol, polyacrylamide and poly(acrylamide-coacrylamido-2-methylpropane sulfonate). Phenol is the phenolic compound of choice. At a formation temperature greater than 300° F., trioxane, the preferred aldehyde producing compound decomposes to yield formaldehyde which reacts with phenol to form phenolic resin in situ. The resin gels the polymer and forms a solid gel in a heated zone of the formation.

13 Claims, 3 Drawing Sheets

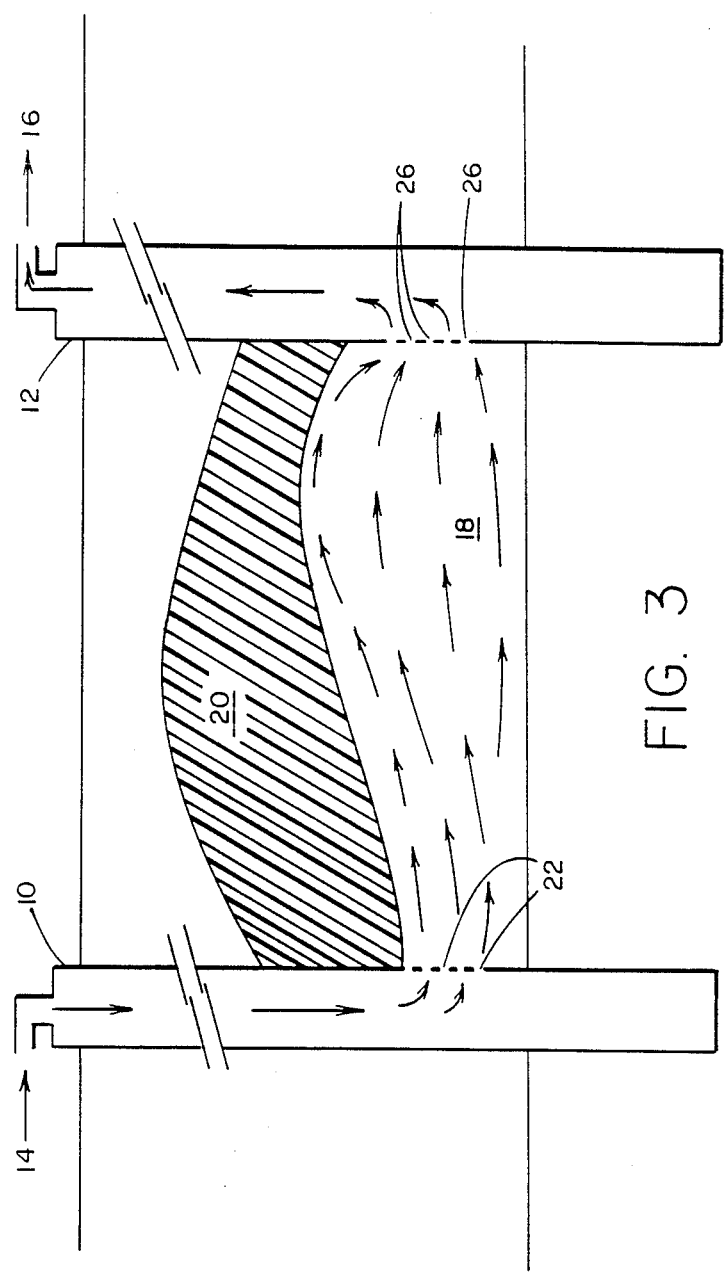

COMPOSITION FOR SELECTIVE PLACEMENT OF POLYMER GELS FOR PROFILE CONTROL IN THERMAL OIL RECOVERY

RELATED APPLICATIONS

This application is related to copending application Ser. No. 068,290, filed July 1, 1987 now U.S. Pat. No. 4,804,043. It is also related to Ser. No. 292,795.

FIELD OF THE INVENTION

This invention relates to the composition of a temperature activated gel which can be used for profile control in steam enhanced oil recovery so that increased amounts of hydrocarbonaceous fluids can be obtained from a steam underswept zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include waterflooding, miscible flooding, and thermal recovery.

A problem that arises in various flooding processes is that different strata or zones in the reservoir often possess different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and thus divert the displacing fluid into the underswept low permeability, oil rich zones. Among the polymers examined for improving waterflood conformance are metal cross-linked polysaccharides, metal cross-linked polyacrylamides, and organic cross-linked polyacrylamides.

Polymeric gels are disclosed in several U.S. patents. Among these is U.S. Pat. No. 4,157,322 which issued to Colegrove on June 5, 1979. This gel is formed from water, a polysaccharide polymer, an acid generating salt and a melamine resin. A polymeric gel is disclosed in U.S. Pat. No. 4,658,898 which issued to Paul et al. on Apr. 21, 1987. This patent discloses an aqeuous solution of heteropolysaccharide S-130 combined with cations of basic organic compounds which cations contained at least two positively charged centers. U.S. Pat. No. 4,716,966, issued to Shu on Jan. 5, 1988, discloses a gel formed by amino resins such as melamine formaldehyde which modify biopolymers in combination with transitional metal ions. These patents are hereby incorporated by reference herein.

Basic to the problem of diverting displacing fluid with polymeric gels is the necessity of placing the polymer where it is needed, i.e. in the high permeability zone. This is possible when xanthan biopolymers are cross-linked with metal ions such as $Cr^{+3}$ above ground to give gels. These gels are shear stable and shear thinning. They can be injected into the formation where they then reheal. Due to the gel's rheological properties, they will of necessity go into high permeability zones. However, many other gel systems are formed in-situ. One system disclosed in U.S. Pat. No. 3,557,562 contains acrylamide monomer, methylene-bis-acrylamide as an organic cross-linker, and a free radical initiator. This system undergoes polymerization in the formation to give a polyacrylamide cross-linked with methylene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of cross-linking hydrolyzed polyacrylamide. Even though the polyacrylamide solution has a viscosity greater than water, it is not capable of showing the selectivity that a gel can. Thus, polyacrylamides cross-linked with chromium in-situ can also go into low permeability zones. It is not useful to cross-link polyacrylamides above ground and inject them as gels, because polyacrylamide gels undergo shear degradation.

In addition to the creation of "thief" zones during a waterflooding recovery technique, steam flooding or steam stimulation processes create a unique situation in a formation which is gravity override due to steam's low density. Because of the steam's low density, the sweep path of steam is therefore biased towards the top of pay zone. Thus, the area invaded by the override steam may or may not be of high permeability. Although steam preferentially enters a high permeability or thief zone, the high temperature of the steam will also remove hydrocarbonaceous fluids from portions of low permeability zones. As the distance increases from steam entry into the formation, the temperature will decrease. As long as the temperature is hot enough hydrocarbonaceous fluids will be removed from the "thief" zone as well as portions of low permeability zones.

When steam has broken through to a production well during a steamflood, a heated portion of the formation will communicate with an injector well. This heated portion may include portions of both high and low permeability steam override zones. For this reason, a gel system which can selectively enter a high permeability "thief" zone may not enter a low permeability zone. Thus, a size selective gel may not prevent steam from entering into a heated low permeability zone which has been depleted of hydrocarbonaceous fluids.

Therefore, what is needed is a composition which forms a gel in-situ in a steam overswept zone of a formation only when said zone has been previously heated during a steamflood enhanced oil recovery process regardless of its permeability.

SUMMARY

This invention is directed to a composition useful for closing pores in a heated steam overswept zone which composition comprises a temperature activated gellable mixture which forms a solid gel. In one embodiment of this invention, the more permeable zones and the override zone are heated during a steam flooding enhanced oil recovery (EOR) process. Due to preferential steam flow through said zone, such zones are overswept by steam. Therefore they are more oil-depleted. Once the steam flow is stopped, the heat activated gellable mixture is injected into the formation. When the gellable mixture has travelled the desired distance into the formation, injection of said gellable mixture is ceased. Heat emitted from the steam overswept zone activates the gellable mixture upon reaching a temperature of above 300° F. thereby causing it to form a solid gel and close pores in the steam overswept zone.

Gellable aqueous compositions which can form a solid gel upon reaching a temperature above 300° F. are comprised of selected water dispersible polymers, phenolic compounds, and aldehyde producing compounds. Polymers which are utilized herein are selected from a member of the group consisting of polyvinyl alcohol, polyvinyl alcohol copolymers, polyacrylamide, polyvinyl amine, sulfonated polyvinyl alcohol, and poly(acrylamide-co-acrylamido-2-methylpropane sulfonate). Phenolic compounds which can be used include phenol, catechol, resorcinol, phloroglucinol, 4,4'-diphenol, 1,3-dihydroxynaphthalene, and related similar compounds. Aldehyde producing compounds which can be utilized herein upon reaching a temperature above about 300° F. include trioxane and paraformaldehyde, tetraoxane.

It is therefore an object of this invention to provide for a temperature activated gellable composition which can be delivered into a heated steam overswept zone having a temperature sufficient to activate said composition and selectively form a solid gel therein.

It is another object of this invention to provide for a temperature activated gellable composition which can be delivered into a formation's steam override zone having a temperature above about 300° F. and thereafter form a solid gel therein.

It is yet another object of this invention to provide for a composition which avoids forming a solid gel in a steam underswept zone or a low temperature zone of a formation.

It is another further object of this invention to provide for a composition that will minimize gel damage to a zone of lower permeability while closing pores in a higher permeability zone having a temperature above about 300° F.

It is still another object of this invention to inject a temperature activated gellable composition into a producer well and cause a solid gel to form so as to divert sweep fluids into an unswept formation zone.

It is a still yet further object of this invention to provide for a composition which will increase the efficiency of a drive fluid through a formation thereby increasing the yield of hydrocarbonaceous fluids therefrom.

BRIEF DESCRIPTION OF THE DRAWINGS

FIG. 3 is a diagrammatic plan view where the high permeability and override zones have been closed with a temperature reactive gel while steam is passing through a low permeability zone or area of high oil saturation.

DESCRIPTION OF THE PREFERRED EMBODIMENTS

Figure 1:
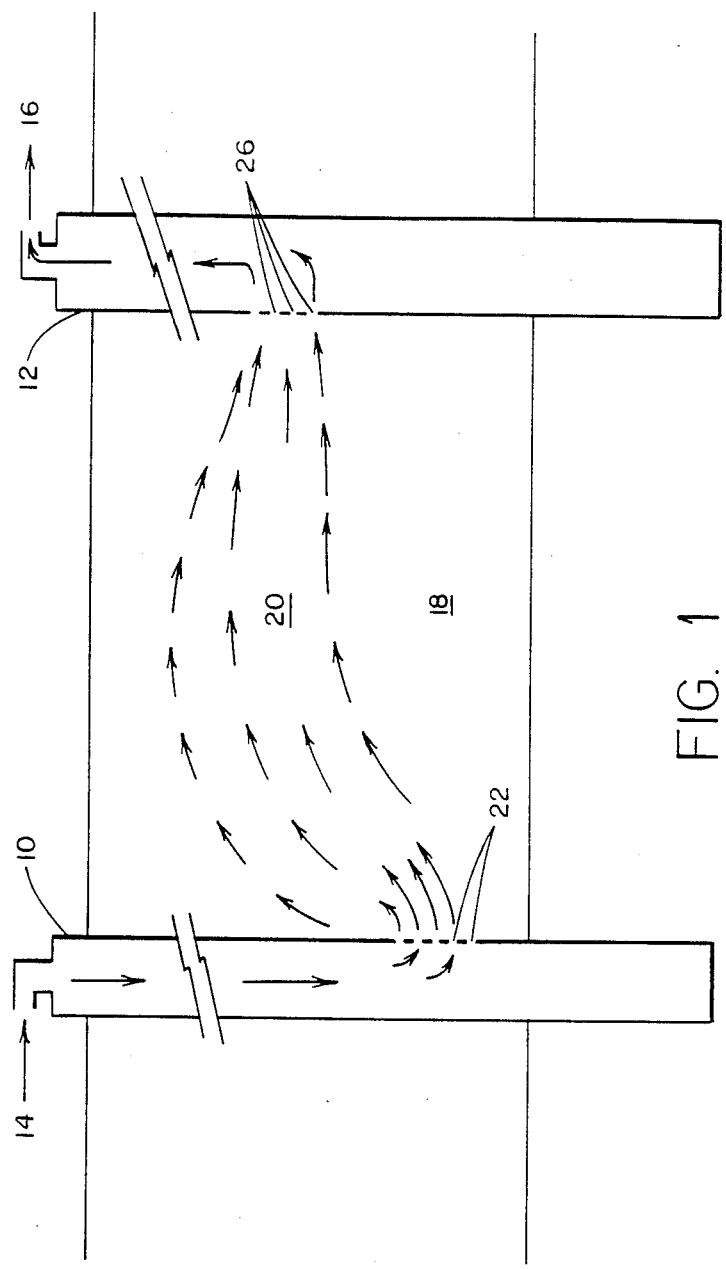
FIG. 1 is a diagrammatic plan view of a formation where steam has passed through a high permeability zone and its override area into a production well.
Figure 2:
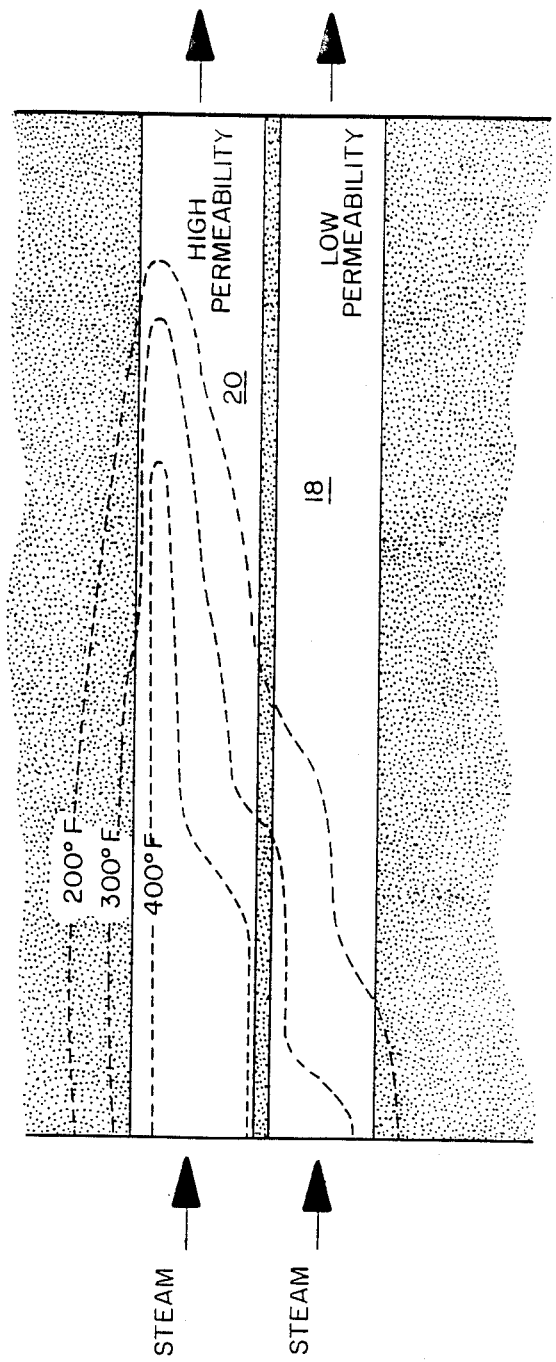
FIG. 2 is a schematic representation which illustrates temperature distribution into high and low permeability zones of a formation during steam flooding.

During the recovery of hydrocarbonaceous fluids from a formation wherein a steam flooding process is utilized, as is shown in FIG. 1, steam enters conduit 14 of injection well 10. Afterwards, steam exits injection well 10 via perforations 22 and enters high permeability zone 20. Steam and hydrocarbons obtained from high permeability zone 20 exit through production well 12 via perforations 26. Thereafter, steam and hydrocarbonaceous fluids exit production well 12 via conduit 16. During this steam flooding process, the formation is heated up by the steam. While being heated, a temperature contour is developed in the steam flooded formation. Thus, the "thief" zones and zones swept by override steam have the highest temperatures in the formation while the underswept parts in the formation have the lowest. This concept is illustrated in FIG. 2. When it becomes uneconomical to continue injecting steam to recover hydrocarbonaceous fluids from high permeability zone 20, high permeability or overswept zone 20 is closed so that hydrocarbonaceous fluids can be removed from low permeability zone 18. Closing of the overswept zone is depicted in FIG. 3. In the practice of this invention, an aqueous gellable temperature activated mixture is injected via conduit 14 into injection well 10 where it enters high permeability or overswept zone 20. When the gellable temperature activated mixture comes into contact with heated high permeability or overswept zone 20, components in the aqueous gellable mixture form a solid gel which blocks pores in high permeability zone 20. Due to the high porosity of high permeability or overswept zone 20, the aqueous gellable mixture preferentially enters high permeability or overswept zone 20. This aqueous gellable mixture is injected into the high permeability or overswept zone 20 after the steam flooding operation has been ceased.

Once in high permeability zone 20, the aqueous gellable mixture is allowed sufficient time to form a solid gel. Generally the solid gel will form at a temperature greater than about 300° F. in about from 1 to about 20 days. Although some of the aqueous gellable mixture may enter low permeability or underswept zone 18, it will not form a gel in that portion of low permeability zone 18 where the temperature is too low. Any gellable mixture which enters low permeability zone 18 where the temperature is too low for gelation can be removed therefrom by pumping a spacer volume of cold water therethrough so as to make the mixture ungellable. An additional benefit of the ungelled aqueous mixture is that being viscous it can act as a mobility control agent so as to facilitate the removal of hydrocarbonaceous fluids from low permeability zone 18. Alternatively, any ungelled materials can be pumped out or produced back to the surface if the producer well is treated. If the gellable compositions are used in conjunction with a water-alternating-gas (WAG) process, the ungelled material need not be pumped or removed from the formation since it can advantageously act as a mobility control agent. A WAG process is discussed in U.S. Pat. No. 4,640,357 which is incorporated by reference herein in its entirety.

Aqueous gellable temperature activated compositions which can be utilized herein are comprised of a polymer, a phenolic compound, and an aldehyde. Polymers utilized herein are water dispersible polymers. The term "polymer" is employed generically to include both homopolymers and copolymers. The term "water-dispersible polymers" is used generically to include those polymers which are truly water-soluble and those polymers which are dispersible in water or in other aqueous medium to form stable colloidal suspensions which can be gelled. Also, the term "aqueous dispersion" is utilized generically to include both true solutions and stable colloidal suspensions of components of the composition of this invention which can be gelled as will be described herein. Water-dispersible polymers which are used herein are selected from a member of the group consisting of polyvinyl alcohol, polyacrylamide, sulfonated polyvinyl alcohol, and poly(acrylamide-co-acrylamido-2-methylpropane sulfonate). Polyvinyl alcohol (PVA) at various degrees of hydrolysis are useful. Other polymers containing OH, $NH_2$, $CONH_2$, and SH are also useful. Polyvinyl amine, and copolymers containing the previously mentioned functional groups are useful. Any of these water-dispersible polymers are placed into an aqueous mixture in amount of from about 0.5 to about 10.0 wt. %. The aqueous medium can comprise fresh water, brackish water, or sea water, and mixtures thereof. Polyacrylamide and poly(2-acrylamido-2-methylpropane sulfonate) are discussed in U.S. Pat. No. 4,440,228 which issued on Apr. 3, 1984 to Swanson. This patent is hereby incorporated herein in its entirety.

After placing the selected water-dispersible polymer into the aqueous medium, a phenolic compound is added to the mixture. Phenolic compounds which can be used herein include phenol, naphthol, catechol, resorcinol, phloroglucinol, 4,4'-diphenol, 1,3-dihydroxynaphthalene, and related similar compounds. The amount of phenolic compound utilized should be in excess of 0.5 wt. % or higher. The amount of phenolic compound used herein should be sufficient to impart the desired gelation effect within the desired time period.

Once the phenolic compound has been added, a water-dispersible aldehyde producing compound is mixed into the aqueous mixture. Representative examples of such aldehyde producing compounds include formaldehyde, trioxane, tetraoxane, polyoxymethylene, and other aldehyde precursors. The term "water-dispersible" is employed generically to include aldehyde producing compounds which are truly water-soluble and those aldehydes of limited water solubility but which are dispersible in water or other aqueous media so as to be effective gelling agents. The preferred aldehyde is trioxane.

Any suitable amount of trioxane and phenolic compounds can be utilized herein. In all instances, the amount of aldehyde and phenolic compound used should be in an amount sufficient to cause gelation of an aqueous dispersion of a polymer, the aldehyde, and the phenolic compound. As a general guide, the amount of aldehyde used in preparing the gel compositions herein will be in the range of from about 0.5 to about 10.0, preferably 1.0 to about 5.0 wt. % based on the total weight of the composition.

A preferred temperature activated gellable mixture comprises polyvinyl alcohol, phenol, and trioxane. The effect of temperature on said mixture is shown in Table 1. When exposed to a formation having a temperature of about 300° to about 350° F. or higher, a firm gel will form in about 1 day to about 15 days when 0.05 to about 0.5 wt. % of sodium hydroxide is utilized as is shown in Table 2. Polyvinyl alcohol is used in amounts of about 0.5 to about 5.0 wt. %. Phenol is used in about 0.5 to about 5.0 wt. % or higher. The phenol to trioxane ratio is about 0.5 to 1.5, preferably about 1.0. The polyvinyl alcohol/phenol weight ratio is from about 0.2 to about 2. Of course, a lower ratio is used when other higher molecular weight polymers are utilized. The total concentration of polymer, phenol and trioxane is directly proportional to the gel strength. A rigid gel is formed which is proportional to the total materials content.

TABLE 1

Temperature Sensitivity of PVA/Phenol/Trioxane*Gelation

| Temp, °F. | 200 | 300 | 350 | 400 | 450 |
|---|---|---|---|---|---|
| Gel Time, days | no gel | no gel | 1 | 1 | 1 |

*2.5% PVA, 4% phenol, 3% trioxane

TABLE 2

Effect of NaOH Concentration on Gel*Time

| NaOH, % | 300° F. | 350° F. | 400° F. | 450° F. |
|---|---|---|---|---|
| 0.05 | No gel | 15 days | 8-9 days | 4 days |
| 0.1 | " | 15 days | 5-7 days | 2 days |
| 0.2 | " | 12 days | 2 days | 1 day |
| 0.3 | " | 9 days | 1 day | 1 day |
| 0.5 | " | 6 days | 1 day | 1 day |

*2.5% PVA, 4% phenol, 3% trioxane

Prior to injecting the aqueous temperature activated gellable mixture, the formation is heated as mentioned above during the steam flooding enhanced oil recovery process. A formation temperature of about 300° F. or greater is preferred. The method of this invention can also be used when the area in or substantially near either the injection well or the production well has been heated to the desired temperature. This method is particularly beneficial when it is desired to close the heated area around a production well which has suffered a premature steam breakthrough. In this situation, steam injection is ceased and the temperature activated gellable mixture is injected into the production well for a time sufficient to enter the areas which comprise the premature breakthrough zone. Afterwards the gellable mixture in that zone is allowed to form a solid gel. Once the solid gel is formed, an enhanced oil recovery method in which a drive fluid is utilized can be injected either through the injection well or the production well to recover hydrocarbonaceous fluids from a less permeable zone of the formation.

As demonstrated, the novelty of this invention is that the cross-linking reaction is activated at elevated temperatures greater than about 300° F. The cross-linking reaction is not activated at temperatures under 300° F. At high temperatures, trioxane, a cyclic dimer of formaldehyde decomposes to yield formaldehyde which in turn reacts with phenol to form phenolic resin, the gelant, in situ. Phenolic resin then gels the polymer.

Where it is desired to obtain increased sweep efficiency, gels of this invention can be used to plug a previously sweep portion of a formation which has been heated to a temperature in excess of 300° F. Said gels can be directed to areas of increased porosity. Once a solid gel has formed, hydrocarbonaceous fluids can be removed from an area of lesser permeability or an underswept zone by utilization in any of the below methods.

One method where gels of this invention can be utilized is prior to a waterflooding process for the recovery of oil from a subterranean formation. After plugging the more permeable zones of a heated formation with the novel gels of this invention, a waterflooding process can be commenced. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a cyclic carbon dioxide steam stimulation process to recover heavy oil from a lower permeability zone to obtain greater sweep efficiency. Cyclic carbon dioxide steam stimulation can be commenced after plugging the more permeable zones of the reservoir with the novel temperature activated gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process by lowering the carbon dioxide minimum miscibility pressure ("MMP") and recovering oil. Prior to commencement of the carbon dioxide process, a more permeable or overswept zone is heated and subsequently plugged with these novel gels. Carbon dioxide MMP in an oil recovery process is described in U.S. Pat. No. 4,513,821 issued to Shu which patent is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A cross-linked gel product obtained by activating components at a temperature greater than about 300° F. comprising:
   (a) water;
   (b) a cross-linkable polymer selected from a member of the group consisting of polyvinyl alcohol, polyvinyl alcohol copolymers, and sulfonated polyvinyl alcohol which member has at least one functional group selected from a member of the group consisting of an amine, an amide, a hydroxyl, or a thiol group;
   (c) a phenolic compound; and
   (d) a water-dispersible aldehyde producing compound when heated to a temperature above about 300° F. in a formation yields sufficient formaldehyde to react with said phenolic compound thereby forming a phenolic resin which combines with the polymer and makes a solid cross-linked gel.

2. The gel as recited in claim 1 where the phenolic compound comprises phenol, naphthol, catechol, resorcinol, phloroglucinol, 4,4'-diphenol, and 1,3-dihydroxynaphthalene.

3. The gel as recited in claim 1 where the aldehyde producing compound comprises trioxane, tetraoxane and polyoxymethylene.

4. The gel as recited in claim 1 where said gel contains the polymer in about 0.5 to about 5.0 wt. percent, the phenolic compound in about 0.5 wt. percent or higher, and the aldehyde producing compound in about 0.5 to about 5.0 wt. percent.

5. The gel as recited in claim 1 where a rigid gel forms at a temperature of from about 300° F. to about 450° F. in about 1 day to 15 days.

6. A cross-linked gel product obtained by activating components at a temperature greater than about 300° F. comprising:
   (a) about 0.5 to about 5.0 wt. percent of a cross-linkable polymer selected from a member of the group consisting of polyvinyl alcohol, polyvinyl alcohol copolymers, and sulfonated polyvinyl alcohol which member has at least one functional group selected from a member of the group consisting of an amine, an amide, a hydroxyl, or a thiol group,
   (b) about 0.5 wt. percent or higher of a phenolic compound; and
   (c) about 0.5 to about 5.0 wt. percent of a water-dispersible aldehyde producing compound when heated to a temperature above about 300° F. in a formation yields sufficient formaldehyde to react with said phenolic compound thereby forming a phenolic resin which combines with the polymer and makes a solid cross-linked gel sufficient to close one or more permeable zones in said formation.

7. The gel as recited in claim 6 where said phenolic compound comprises phenol, naphthol, catechol, resorcinol, phloroglucinol, 4,4'-diphenol, and 1,3-dihydroxynaphthalene.

8. The gel as recited in claim 6 where the aldehyde producing compound comprises trioxane, tetraoxane and polyoxymethylene.

9. The gel as recited in claim 6 where a rigid gel forms at a temperature of from about 350° F. to about 450° F. in about 1 day to 15 days.

10. The gel as recited in claim 1 where the gel contains sodium hydroxide in about 0.05 to about 0.5 wt. percent.

11. A cross-linked gel product obtained by activating components at a temperature greater than about 300° F. comprising:
    (a) water;
    (b) about 0.5 to about 5.0 wt. percent of a cross-linkable polyvinyl alcohol polymer;
    (c) about 0.5 wt. percent or higher of phenol;
    (d) sodium hydroxide in an amount of about 0.05 to about 0.5 wt. percent; and
    (e) about 0.5 to about 5.0 wt. percent of trioxane when heated to a temperature of from about 300° to about 450° F. in a formation yields sufficient formaldehyde to react with said phenol thereby forming a phenolic resin which combines with said polymer and makes a solid cross-linked gel.

12. The gel as recited in claim 11 where a rigid gel is formed in from about 1 day to about 15 days.

13. The gel as recited in claim 11 where the polyvinyl alcohol to phenol weight ratio is from about 0.2 to about 2.0 and the phenol to trioxane weight ratio is about 0.5 to about 5.0.

* * * * *